Figure 1:
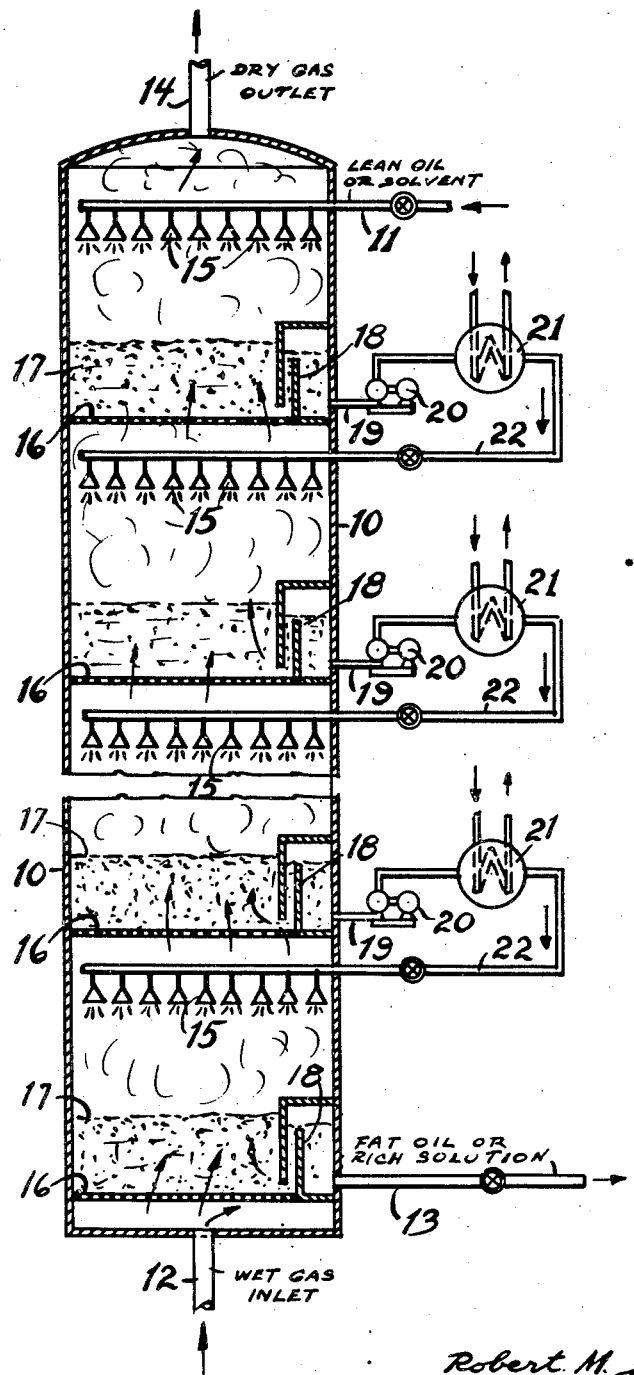

Patented May 17, 1949

2,470,438

UNITED STATES PATENT OFFICE 2,470,438

ABSORPTION PROCESS

Robert M. Jackson, Baton Rouge, La., and Paul J. Harrington, Mountainside, N. J., assignors to Standard Oil Development Company, a corporation of Delaware Application September 17, 1943, Serial No. 502,756

5 Claims. (Cl. 183—120)

This invention relates to means for ensuring intimate contact between a solvent and a vapor or gas, and relates particularly to the treatment of petroleum fractions involving the interabsorption of constituents of liquid and vaporous or gaseous streams.

An object of the invention is the furnishing of a method and apparatus by which liquid and vaporous or gaseous streams are brought into intimate contact by the dispersion of the gas through the liquid and dispersion of the thus treated liquid into the thus treated gas. Thus a particular object of the invention is to bring into effect substantially gaseous and liquid film absorption conditions in countercurrent treating operations.

Another object of the invention is the provision of means for improving plant treating efficiencies in the refining of petroleum distillates by increasing contact plate efficiency in the combination of intimate dispersion of the gaseous fractions into the liquid fractions and of the liquid fractions into the gaseous fractions, thereby enhancing recovery for a given number of plates or the use of fewer plates than formerly for a given recovery; and the use of intercooling between successive contact plates so as to decrease oil rates for a given recovery or increase recovery for a given oil rate.

These other objects will become apparent in the following description.

A particular feature of the invention consists in having a tower of necessary diameter to accommodate the quantity of gas to be handled at optimum velocities and of height permitting such a number of contact plates as are determined by the particular degree of the proposed interabsorption of constituents of the liquid and vapor streams. Assuming illustration of the invention in regard to the contacting of liquid and gaseous petroleum fractions as in the rectification of oils or in the solvent treating, washing or scrubbing of petroleum gases, the hydrocarbon oil is sprayed into the uppermost of several contact sections in a tower. It is common to spray the oil through nozzles which are so designed as to disperse the oil into the minimum sized droplets that can fall under the force of gravity countercurrently to the gases rising through the contact section. The oil which is absorbing components from the gas is collected on a plate and allowed to build up to a desired height. The height to which the absorbing liquid is permitted to accumulate is determined by the time required by the gases bubbling through the oil to approach as near to equilibrium as is desired.

The oil is allowed to flow off the absorption plate from a sealed overflow dam and the level of the oil on the plate is thus controlled. The bottom plate of the contact section usually consists of a porous filter which can be rested on a screen or other such suitable support. Sufficient pressure drop is allowed across the porous filter for the desired rate of flow of the gas. The gas bubbles formed are uniformly small and are injected into the oil at such a rate as to cause agitation and mixing of the gas with the oil. The oil withdrawn from any except the lowest of the contacting sections is directed to the suction of a pump and discharged through an exchanger that is cooled by water to a lower temperature level. The cooled oil is then discharged through a series of nozzles at the top of the next lower contact section in the tower. An alternative to the use of spray nozzles is to allow the absorbing liquid to flow through perforated plates or over serrated weirs and the gas is directed through the screen or curtain of the falling liquid. An alternate for the porous filter is a perforated plate.

Thus, the invention resides in providing for the passage through several zones of oil vapors countercurrently to the flow of sprays or curtains of absorbing liquid, which, after passing through one zone, is cooled externally before passing into the next contact zone. Interabsorption of a higher order therefore occurs as a result of the passing of the gases through successive zones of cooled liquid spray in quantity to ensure intimate contact of the gas with the liquid. Under the conditions of contacting, interabsorption occurs between the gaseous and liquid films coupled with the further advantage of maximum interzone cooling of the liquid. The cooling means are preferably located outside of the absorption tower but may be of the nature of internal condensers. The provision of external cooling means is particularly advantageous in minimizing obstructions within the towers and the absence thereby of such complications. External cooling is particularly advantageous in the operation of towers functioning under reduced pressures.

Advantageous for illustration purposes will be processing in connection with the fractional distillation of any volatile liquid mixture or for effecting intimate contact between a liquid and vapor for such purposes as washing, scrubbing, etc., of petroleum vapors.

In the figure four contact zones of tower 10 are specifically shown, the actual number, however, being determined by particular requirements. In each zone, oil is sprayed from the uppermost section countercurrently to the passing of gas from the bottom of the section. Also, means are provided in each zone for removing a portion of the accumulated liquid and passing through a cooler and the returning of the cooled liquid as spray to the next lower contact section. As shown in the drawing, lean oil is admitted to the uppermost contact section of the tower through line 11 of tower 10, while the gas to be treated is admitted to the lower portion of the tower through line 12 of tower 10. The enriched oil leaves the tower near the bottom of the lower contact section, as shown in the figure, through line 13 and the treated gas through the top of the tower through line 14.

In the figure, taking the function of the uppermost contact section as being typical of the processing in the other contact sections in the tower, the lean oil is supplied through line 11 and passed into the contact section through nozzles 15. The gas passing from the lower contact section passes through the porous plate 16 and a porous material or dispersion plate 17. During the passage of the gas upwards through the porous material 17 over which liquid from the nozzle in the nozzles 15 is being passed countercurrent to the flow of gas, intimate contact between the gas and oil is maintained. The liquid level maintained on the porous material 17 is determined by the height of a sealed overflow dam 18. The overflow of liquid then passes through line 19 through pump 20 to the heat exchanger 21 and returns to the tower absorption system through line 22 supplying nozzles of the type of 15 for the contact section lower than that for which the processing has been described. The porous material 17 may be of the nature of sand or other finely divided siliceous or metallic material, or a sintered porous plate. Processing of the same nature is conducted throughout the various contact sections until at the base of the tower oil enriched with the soluble constituents of the gas is removed through line 13 while depleted gas is removed through line 14.

Processing according to the invention increases plate efficiencies in absorption towers from between 15% and 20% to values approaching 90% or even higher. The increased plate efficiency affords improved recovery from a given number of contact sections and the use of fewer contact sections when a given recovery is desired when compared with the conventional design of bubble plate absorption columns. Another advantage of processing according to the invention lies in the adaptation of intercooling at each contact plate which can be made practical because of the smaller number of plates than hitherto required in order to obtain a desired degree of recovery. The use of the intercooling means results in a decreased oil rate for a given recovery or an improved recovery for a given oil rate. Also, since the number of contacting sections will be materially reduced over the number required in a bubble tower for a given recovery, cleaning of the equipment will be facilitated as the cleaning will consist largely of removing sediment and scale from the plates.

What is claimed is:

1. A process for countercurrently treating a gas with a liquid which comprises introducing the gas into the lowermost stage of a plurality of vertical stages, introducing a liquid in finely divided form into the uppermost stage of said plurality of stages, maintaining two bodies of liquid in each of said stages, passing the gas successively through only one of the two bodies of liquid in each of said stages, continuously withdrawing liquid from the other of said bodies of liquid at each of said stages, cooling said withdrawn liquid, continuously spraying said cooled liquid into the next lower stage where it contacts countercurrently flowing gas emerging from one of said bodies of liquid in said lower stage, repeating said process in each of said stages, and removing from the uppermost stage and the lowermost stage the gaseous and liquid products respectively.

2. An improved tower for countercurrently contacting downflowing liquid and upflowing vapor streams, which comprises means for introducing a vapor stream into the bottom and means for withdrawing a vapor stream from the top of said tower, means for introducing a liquid stream into the top and means for withdrawing a liquid stream from the bottom of said tower, a plurality of contacting zones intermediate the top and bottom of said tower, said contacting zones comprising a pierced plate which permits the upflow of vapor from an adjacent zone to the zone above, said pierced plate having attached thereto a vertical weir extending above the plate, the ends of which are attached to the wall of the tower forming a trough whereby liquid on the top of said pierced plate flows over the top of said weir into the trough area, said contacting zone being further characterized by having a hood element over the top of said trough area, whereby the flow of gas from said trough area upwardly into the contacting zone is prevented, means for withdrawing liquid from the tower from the bottom of said trough area, cooling means for cooling the withdrawn liquid and means for reintroducing the cooled liquid into the zone below the zone from which it is withdrawn.

3. Apparatus as defined by claim 2 wherein said means for introducing the cooled liquid into the adjacent zone comprises a plurality of sprays.

4. Apparatus as defined by claim 3 wherein said sprays are positioned above said hood element.

5. Apparatus for countercurrent contact of vapors and liquids in substantially continuously dispersed form, comprising a vertical tower, a plurality of horizontal plate members in said tower dividing the interior thereof into a vertical series of contact chambers, said plates permitting preferential passage of vapors therethrough, a body of vapor and liquid dispersive material on each plate, a liquid receiver section on each plate communicating with said dispersive material, means for continuously introducing a liquid material as a dispersion into the upper portion of the uppermost chamber in said series of chambers, means for withdrawing liquid from each receiver in each chamber and for introducing said liquid withdrawn into the upper portion of the chamber next below as a dispersion of liquid, means for continuously introducing a vaporous material into the tower below the lowermost plate and for withdrawing said material from the uppermost chamber after passage through the series of chambers and means for withdrawing liquid from the tower by way of the lowermost liquid receiver therein.

ROBERT M. JACKSON.
PAUL J. HARRINGTON.

(References on following page)

REFERENCES CITED

The following references are of record in the file of this patent:

UNITED STATES PATENTS

| Number | Name | Date |
|---|---|---|
| 723,011 | Naef | Mar. 17, 1903 |
| 1,053,349 | Blanvelt et al. | Feb. 18, 1913 |
| 1,083,885 | Lloyd | Jan. 6, 1914 |
| 1,257,400 | Robinson | Feb. 26, 1918 |
| 1,562,009 | Straus | Nov. 17, 1925 |
| 1,813,024 | Clarke et al. | July 7, 1931 |
| 1,824,458 | Beall | Sept. 22, 1931 |
| 1,870,351 | Wagner | Aug. 9, 1932 |
| 1,987,267 | Ragatz | Jan. 8, 1935 |
| 2,070,578 | Bowman | Feb. 16, 1937 |
| 2,168,683 | Raigorodsky | Aug. 8, 1939 |
| 2,234,385 | Ryner | Mar. 11, 1941 |

FOREIGN PATENTS

| Number | Country | Date |
|---|---|---|
| 404,580 | Germany | Oct. 30, 1924 |
| 551,359 | Germany | May 30, 1932 |
| 485,181 | Great Britain | May 16, 1938 |